United States Patent Office 3,449,664
Patented June 10, 1969

3,449,664
MAGNETIC REACTION TESTING APPARATUS AND METHOD OF TESTING UTILIZING SEMICONDUCTOR MEANS FOR MAGNETIC FIELD SENSING OF AN EDDY-CURRENT-REACTION MAGNETIC FIELD
George H. Smith, Columbus, Ohio, assignor to F. W. Bell, Inc., Columbus, Ohio, a corporation of Ohio
Filed May 16, 1966, Ser. No. 550,399
Int. Cl. G01r 33/14, 33/06, 33/12
U.S. Cl. 324—40          15 Claims

ABSTRACT OF THE DISCLOSURE

Non-destructive testing of electrically conductive materials is accomplished by an eddy-current, magnetic reaction field testing method utilizing apparatus which induces a flow of eddy currents in the test material and detects a resulting magnetic field which includes magnetic reaction field components due to the eddy currents and is indicative of the characteristics or condition of the test material in the region of induced eddy currents. The apparatus comprises a closed loop, magnetizing coil which is juxtaposed to a surface of the test material in inductively coupled relationship for inducing a flow of eddy currents in the material, and semiconductor, magnetic-field-sensing devices disposed radially outward of the magnetizing coil. The semiconductor, magnetic-field-sensing devices respond to the composite magnetic field and are of a size and configuration to respond to only a small portion of the composite field thereby having high resolution for detecting relatively small, localized anomalies in the test material which affect the eddy current flow path.

General description

The apparatus and method of this invention has been designed specifically for the nondestructive testing of structural members formed from electrically conductive materials and an embodiment of a testing apparatus utilizing the principles of this invention is specifically described herein. However, this application of the apparatus and method is not considered as a limitation on the application thereof. The specific application for which this invention was designed is the nondestructive inspection of composite structural devices formed from several structural members which are fastened together to form an integral structure. The fastening techniques utilized in securing the several structural members together include such common and well known fastening devices as rivets or bolts, which extend through the several structural members and are capable of effecting a clamping action. Utilization of either bolt or rivet type fastening devices requires the formation of an aperture or suitable hole in the materials through which the bolt or rivet may extend. Drilling and punching are two well known techniques utilized in the formation of the necessary apertures in the materials and are widely utilized with conventional fabrication techniques. Although the apertures may be readily formed by these well known techniques, the forming operation may adversely affect the metallurgical and structural characteristics of the material, particularly in the area surrounding the aperture. Formation of an aperture utilizing the well known drilling techniques results in the generation of a substantial amount of heat as a consequence of the frictional forces and working of the material. The heat thus generated is dissipated during and after the forming operation and is dissipated at a rate which is dependent on the physical form of the material, the physical characteristics of the material and the localized environment in which the operation is performed.

Where these factors are conducive to a relatively rapid dissipation of heat, the material will be subjected to a quenching action which results in the embrittlement of the material surrounding the aperture. The effects of such embrittlement are not generally ascertainable at the time of formation of the aperture as there will be no outward visible indications of such embrittlement and will only become detectable after the material has been stressed. Thus, in the usual sequence of operations, the several elements will be secured or fastened together by appropriate fastening devices and the composite structure then utilized as designed. After a period of utilization of the structural device with consequent stressing of the materials, minute cracks of the electrical conduction discontinuity type may be formed in the embrittled material surrounding the aperture which may or may not open at a surface of the element. These cracks or discontinuities reduce the structural strength of the material and continued utilization of the device with consequent continued stressing of the material may result in further deterioration until the affected element or elements ultimately fail and are ruptured or otherwise destroyed during the utilization of the device. The detection of the minute cracks and discontinuities as they develop and prior to ultimate failure of the device would permit the appropriate replacement of the affected elements or permit the application of other appropriate corrective action and thereby prevent the ultimate complete failure of a structural device. Early detection of the elements which will ultimately fail is of particular importance with respect to aeronautical structures and air frames.

Heretofore the detection of such minute cracks and discontinuities in the material surrounding the apertures formed in the several elements has only been possible with disassembly of the elements by removal of the fastening devices. When disassembled, the material surrounding the apertures could then be readily inspected with the prior art apparatus and techniques although concealed, internal electrical discontinuities may not be detected. Testing procedures involving disassembly of the elements is a relatively expensive and time-consuming operation and usually results in the destruction of the fastening devices necessitating their replacement in reassembly of the elements. Consequently, testing of such composite structures to determine the existence of such discontinuities has usually been deferred until deemed necessary at predetermined inspection intervals or in the event externally observable characteristics are noticed which may indicate the presence of such minute defects or discontinuities in the materials.

It is, therefore, the primary objective of this invention to provide a method and apparatus utilizing eddy currents for determination of electrical discontinuities in an electrically conductive material.

It is a further object of this invention to provide apparatus for determining and being responsive to electrical discontinuities in a material which utilizes the magnetic reaction of eddy currents induced in the material with the related eddy currents and magnetic reaction being responsive to electrical discontinuities.

It is another object of this invention to provide an apparatus responsive to electrical discontinuities in an electrically conductive material having means for inducing circulation of eddy currents in the material and producing a resultant magnetic-reaction-field and having at least two semiconductor devices for sensing respective portions of the resultant magnetic-reaction-field and providing an output signal related to the differential characteristics of the semiconductor devices.

It is another important object of this invention to provide an apparatus responsive to electrical discontinuities in an electrically conductive material and having a relatively high degree of resolution in determining such discontinuities through utilization of a plurality of semiconductor devices which are adapted to be instantaneously responsive to respective portions of a magnetic-reaction-field produced by the induced circulation of eddy currents in the material.

It is also an object of this invention to provide a method for determining electrical discontinuities associated with an electrically conductive material through the inducement of circulating eddy currents in the material to produce a magnetic-reaction-field and detecting the magnetic-reaction-field through differentially connected semiconductor devices.

These and other objects and advantages of this invention will be readily apparent from the following detailed description of an embodiment thereof and the accompanying drawings.

Figure 1:
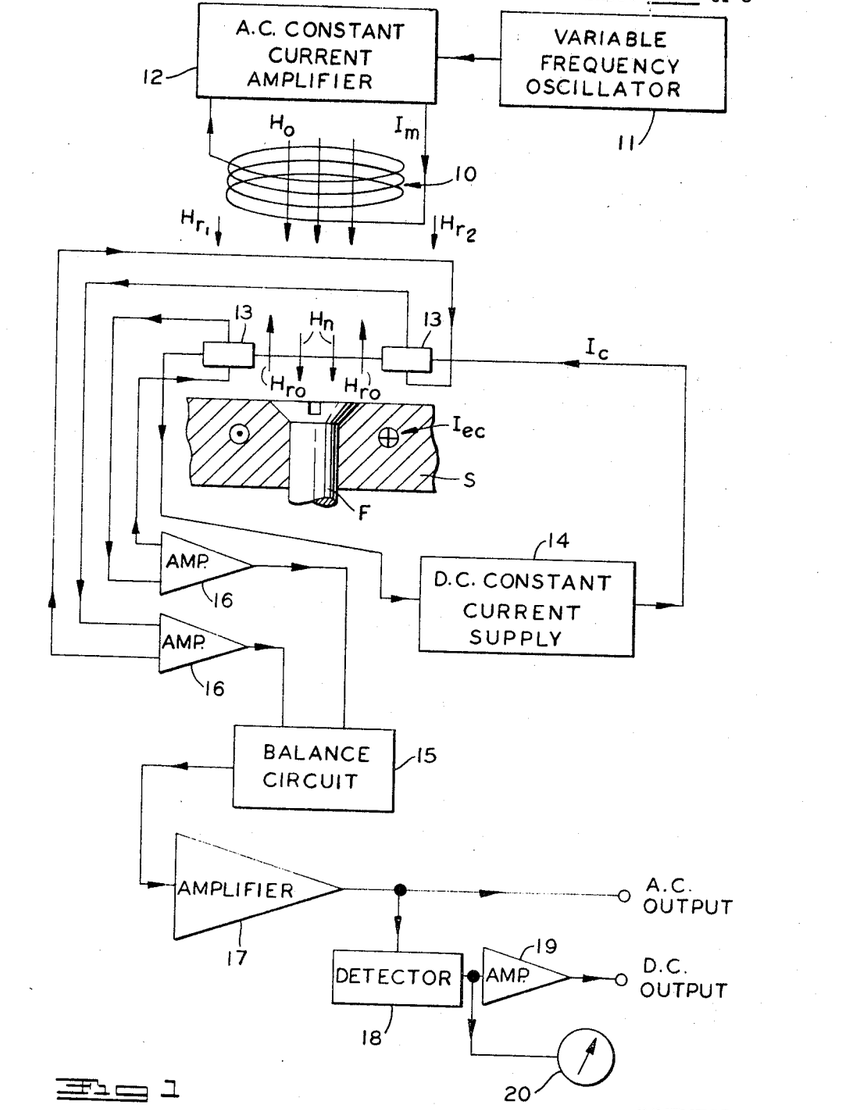
FIGURE 1 is a diagrammatic illustration of an apparatus embodying this invention for determining electrical discontinuities in an electrically conductive material.

Having reference to the drawings and, in particular, to FIGURE 1, an apparatus for determining electrical discontinuities embodying this invention is diagrammatically illustrated as applied in operative relationship to a section of a structural member S having a fastening device F associated therewith. The structural member S is fabricated from an electrically conductive material and the fastener F may or may not be formed from an electrically conductive material. The fastening device F, however, is shown as being provided with a countersunk head and is disposed with the surface thereof flush to the surface of the structural member. A transversely extending slot C is also formed in the head of the fastener F to facilitate engagement with appropriate mechanical applying tools. In this specifically illustrated application, the electrical discontinuities or defects which are of primary importance would occur in the region surrounding the aperture through which the fastening device F extends. It is to be understood, however, that the apparatus may also be readily utilized in conjunction with the structural members which are not formed with an aperture or provided with a fastening device. Irrespective of the specific application of the apparatus, the method of operation and theory remain the same.

The apparatus illustrated in FIGURE 1 comprises, in general, a magnetic-field-generating means adapted to be disposed in inductively coupled relationship to the structural member S and a magnetic-field-sensing means disposed in electromagnetically coupled relationship to the magnetic fields coupled with the structural member. Included in the magnetic-field-generating-means is a closed-loop inductor or coil 10 which may be energized by a current $I_m$ for generation of a magnetizing field. The magnetizing field generated by the coil 10 is indicated in FIGURE 1 by arrows identified by the notation $H_0$ indicating the magnetic field intensity. An appropriate magnetizing current $I_m$ is provided by a variable frequency oscillator 11 driving an alternating current constant-current amplifier 12. A variable frequency oscillator is preferably utilized to permit selective operation of the apparatus at an optimum frequency for the specific application. The A.C. magnetization current $I_m$ flowing through the coil 10 generates an A.C. magnetic field $H_0$ which, when inductively coupled with the structural members S by appropriately positioning the coil in proximity to the surface of the structural member, will induce circulating eddy currents $I_{ec}$ within the body of the structural member. The eddy currents $I_{ec}$ thus induced are also of an A.C. waveform and are illustrated in FIGURE 1 as effectively concentrated in a specific region encircling the aperture through which the fastening device F extends with the plane of circulation being normal to the surface of the drawing. It is to be understood that the eddy currents would normally be nonuniformly although symmetrically distributed throughout the body of the structural member as to both radial distribution and depth of penetration with the greatest current density appearing immediately below the inductor coil 10. The depth of penetration of the eddy currents is dependent on the frequency of the A.C. magnetizing current $I_m$.

The circulating eddy currents $I_{ec}$ thus induced in the structural member S will produce a magnetic-reaction-field as indicated in FIGURE 1 by the arrows identified by the notation $H_r$ as can be readily seen from FIGURE 1, the magnetic-reaction-field $H_r$ opposes the magnetizing field $H_0$ and includes components located centrally of the coil 10 and identified by the notation $H_{r0}$ and components distributed radially outward from the periphery of the coil 10 and identified by the notation $H_{r1}$ and $H_{r2}$. The magnetic reaction field $H_r$ being formed by the eddy currents $I_{ec}$ will encircle the eddy currents with the distribution of the flux lines being determined by the configuration of the flux lines being determined by the configuration of the eddy currents. Due to magnetic coupling losses and reluctance of the magnetic circuit and resistance to the flow of eddy currents in the body of the structural member, the magnetic reaction field $H_r$ will be less than the magnetizing field $H_0$. A resultant magnetic field $H_n$ will thus be formed and include the vectorial components $H_0$ and $H_r$. Reactive impedance in the magnetic and electrical circuits produces a relative phase displacement of the magnetic field components.

Figure 4:
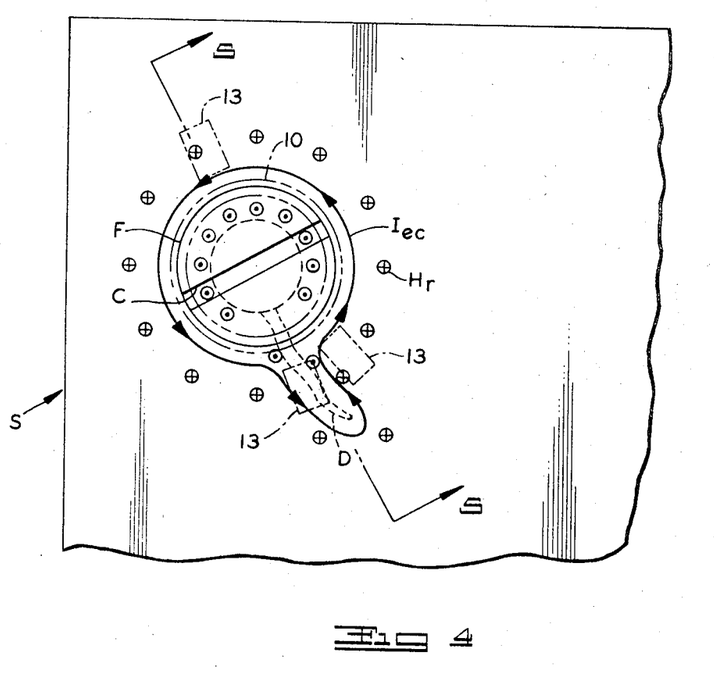
FIGURE 4 is a diagrammatic illustration of the circulating eddy currents and magnetic-reaction-field generated in the materials through the operation of the probe structure.
Figure 5:
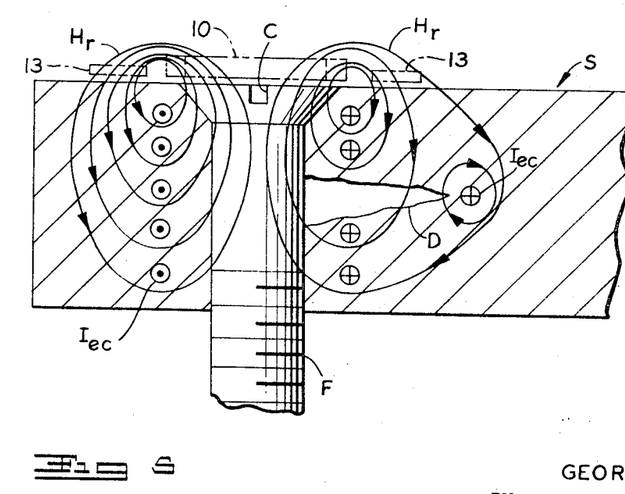
FIGURE 5 is a vertical sectional view, taken along lines 5—5 of FIGURE 4, and further illustrating the typical circulating eddy currents and magnetic reaction field.

The simplified and idealized illustration of the magnetic field components and the eddy current $I_{ec}$ shown in FIGURE 1 is expanded in FIGURES 4 and 5 to further illustrate the distribution of the components of the eddy current and the flux lines of the magnetic-reaction-field. In FIGURE 5, the eddy currents $I_{ec}$ are shown as generally confined to a cylindrical configuration which extends through the structural member S and the flux lines of the magnetic-reaction-field $H_r$ are shown coupled with the components of the eddy current. The frequency of operation of the magnetic-field-generating means is a primary factor determining the penetration of the eddy currents within the body of the structural member and the eddy currents will normally be distributed nonuniformly with respect to depth of penetration as well as radially with the density decreasing with depth of penetration and increase of radial displacement from the idealized point of concentration immediately beneath the inductor coil 10. Although the distribution of the magnetic-reaction-field components and the eddy currents $I_{ec}$ are of a nonuniform nature, the distribution will be generally symmetrical where no electrical conduction discontinuities are present within the body of the structural member S and particularly in the region having a substantial effect on the eddy currents. A fault or defect D representing an electrical conduction discontinuity existing in the body of the structural member S will interrupt the electrically conductive path for the eddy currents $I_{ec}$ and result in a nonsymmetrical distribution of a portion of the eddy currents $I_{ec}$. This resultant nonsymmetrical distribution of the eddy currents $I_{ec}$ is illustrated in FIGURES 4 and 5 with the normally circular path of the eddy currents being distorted as the eddy currents in the region affected by the defect flow around the defect.

Distortion of the eddy currents $I_{ec}$ resulting from the presence of an electrical discontinuity in the body of the structural member will also result in a distortion of the magnetic-reaction-field $H_r$. Distortion of a portion of the eddy currents $I_{ec}$ to a nonsymmetrical path, as illustrated in FIGURES 4 and 5, will produce a nonsymmetrical magnetic-reaction-field configuration which results in a reduction of the net magnetic flux density in the vicinity of the electrical discontinuity D. This reduction in magnetic flux density will be observable in both the central area of the magnetizing coil 10 and at radially outwardly spaced positions relative to the periphery of the magnetizing coil. However, the effect of an electrical discontinuity of relatively small proportions on the magnetic-reaction-field will be substantially masked by the total magnetic field which appears centrally of the coil 10 and having a relatively large portion unaffected by any distortion of the eddy currents. At a distance radially outward from the magnetizing coil, however, the effect of the distortion in the magnetic field will be more readily observable if the area under observation is also of relatively small proportion compared to the total magnetic field. Thus, in accordance with this invention, the effect of the magnetic field is determined by observation of a relatively small portion of the magnetic field in the space radially outward from the magnetizing coil 10 rather than as centrally observed within the coil and results in greatly improved resolution for a more accurate indication of the existence of electrical discontinuities.

Determination of the magnetic field, and in particular the magnetic-reaction-field, is effected by magnetic-field-sensing means incorporated in the apparatus of this invention. The magnetic-field sensing means comprises a pair of semiconductor devices 13 which are operatively connected to an output circuit and are adapted to modify an output signal in response to the magnetic field which is electromagnetically coupled with the respective semiconductor devices. In the illustrated apparatus of FIGURE 1, each semiconductor device 13 comprises a Hall-effect device which is driven by a control current $I_c$ supplied by a suitable direct current constant current supply 14. The current terminals of the two Hall devices 13 are series connected in order that a control current $I_c$ of the same magnitude will drive each device. The output or Hall voltage terminals of the Hall devices 13 are connected to a balance circuit 15 through respective signal amplifiers 16. This balance circuit is of a type utilizing conventional circuitry which differentially combines the Hall voltage signals received from the respective Hall devices 13 and accordingly provides an output signal which is the difference between the two Hall voltage output signals. Since the magnetic field sensed by the Hall devices 13 is of an A.C. waveform while the Hall devices are driven by a D.C. control current $I_c$, the output Hall voltage will also be of an A.C. waveform. The differential signal thus provided by the balance circuit 15 of the output circuit is fed through an amplifier 17 to provide an alternating current output. Also connected to the output of the amplifier 17 is a detector 18 which provides a direct current output that is amplified by an amplifier 19 and may be utilized to operate a visually indicating meter 20. The several amplifiers balance circuit and detector employ conventional circuitry and are, therefore, not further illustrated or described herein. The specific circuits and the interconnection thereof are well-known in the art and this disclosure is believed sufficiently adequate. Similarly, the A.C. and D.C. power supplies 11 and 14 for operating the magnetizing coil 10 and driving the Hall devices 13 employ conventional circuitry and further detailed description or illustration thereof is believed unnecessary for a complete and full understanding of the invention.

In accordance with this invention, the two Hall devices 13 are supported in the plane of the magnetizing coil 10 and in relatively angular displaced relationship to each other. Each Hall device 13 is spaced radially equidistant from the center of the coil 10 or the center of the symmetrical magnetic field developed by the coil and are orientated with the magnetic axis relatively parallel to each other and to the magnetic axis of the coil 10. Also, the Hall devices 13 are disposed a distance radially outward from the coil 10 and the effective concentrated eddy currents $I_{ec}$. In utilizing the apparatus of this invention, the magnetizing coil 10 is supported adjacent to a surface of the structural member S and, in this specific application as shown in FIGURE 5, the coil is coaxially aligned with the fastening device F with the magnetic axis of the coil coaxial with the central axis of the fastener F. For optimum operation, the coil 10 is of a configuration similar to that of the fastening device and in this instance the coil is of a circular shape having a diameter substantially equal to the diameter of the countersunk head at its exposed surfaces. Such a configuration provides an optimum concentration of the eddy currents $I_{ec}$ immediately adjacent the aperture through which the fastening device F extends. Consequently, the distorting effect of electrical discontinuities in the body of the structural member in the region surrounding the aperture through which the fastening device F extends will have the greatest possible influence on the magnetic-reaction-field resulting from the circulating eddy currents. The two semiconductor devices will provide an output signal which is 0 in the case of a symmetrically formed magnetic field but will be of a specific magnitude where an electrical discontinuity exists in the body of the structural member and effects a distortion of the eddy currents $I_{ec}$ and consequent distortion of the symmetrical magnetic field. Orientating the Hall devices 13 relative to the structural member S as indicated in FIGURE 4 with one of the devices overlying the electrical discontinuity D, a differential output signal will be provided at the outputs of the circuits and indicate the presence of such an electrical discontinuity. Orientation of the devices 13 in a relative position other than with one of the devices over a discontinuity will provide a zero signal as each device will be subjected to equal components of the magnetic field resulting in equal Hall voltage outputs that are effectively canceled by the balance circuit 15. Utilization of the apparatus of this invention in this manner will thus provide a relative indication of the two portions of the magnetic field sensed by the Hall devices 13 which eliminates the necessity of calibration for absolute type measuring techniques.

Although this method of determining the presence or nonexistence of electrical discontinuities within the body of a structural member provides a relatively high degree of resolution and the apparatus can be readily constructed to be extremely sensitive to minute changes in the magnetic fields, there are factors which can affect the output indications. For example, the slot C formed in the head of the fastening device F will have an effect on the magnetic fields which will also be sensed by the Hall devices 13. It has been found that the effect of the slot C is of opposite polarity although comparable in magnitude to the normal defects and electrical discontinuities which may be present in the body of the structural member S. Other factors which has a particularly noticeable effect on the type of probe having a diametrical displacement of the Hall devices 13 are thickness of the structural member, localized variations in metallurgical, electrical or physical characteristics of the material, and surface variations which affect the distances between the Hall devices 13 and the surface of the material. Although of a normally nominal value, these factors are nevertheless effective in producing an output signal in the circuit. These factors which affect the diametrically disposed Hall devices 13 may be termed "long-term variables" as they are inherent characteristics of the material and are not related to the electrical discontinuity defects with which the apparatus of this invention is designed to operate. An advantage of the diametrical displacement, however, is that the effect of the slot C will be substantially eliminated.

An arrangement of the semiconductor devices 13, which will effectively eliminate the effect of long-term variables on the output of the apparatus is also illustrated in FIGURE 4. The modified configuration provides positioning of one of the Hall devices 13 in close adjacent relationship to the other device. Reduction of the relative angular displacement of the Hall devices 13 will result in placement of both devices in substantially the same localized area. Accordingly, the long-term variables which are inherent in the material of the structural member will be of minimum consequence and the output of the apparatus will not be substantially affected by such variables. The limiting minimum angular displacement is determined by the physical form of the semiconductor devices and of the anticipated dimension of electrical discontinuities that may exist within the body of the structural member. An angular displacement of approximately 10° is illustrated in FIGURE 4 but such an angular displacement may be substantially reduced through appropriate construction of the apparatus or, if desired, the angular displacement may be increased to a predetermined angle suitable for a particular application.

For the most advantageous operation of the apparatus the magnetizing coil 10 is supported in fixed relationship to the structural member S and the fastening device F and the Hall devices 13 are revolved about the periphery of the coil in order to circumferentially scan the entire area surrounding the aperture through which the fastening device F extends.

Figure 2:
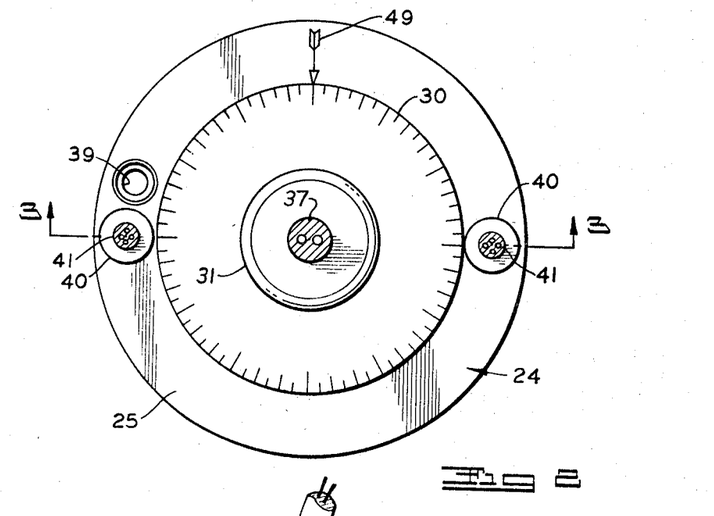
FIGURE 2 is a top plan view of a probe structure of the apparatus for producing and detecting a magnetic field adjacent a surface of the material under observation.
Figure 3:
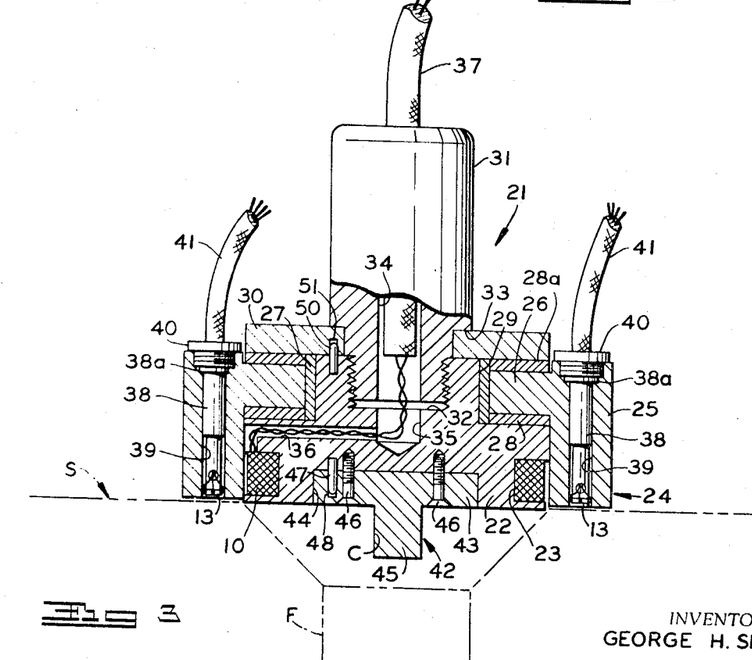
FIGURE 3 is a medial vertical sectional view, taken along lines 3—3 of FIGURE 2.

The magnetizing coil 10 and the semiconductor devices 13 are preferably carried by a suitable probe structure 21 which may be of a form as illustrated in FIGURES 2 and 3. This probe structure 21 is designed to support the magnetizing coil 10 in fixed relationship to a surface of the structural member S and support the Hall devices 13 for revolution about the magnetizing coil 10 in predetermined relationship thereto. Forming the probe structure 21 is a base section 22 having an annular recess 23 extending circumferentially around the lowermost portion thereof. The base section 22 includes an end face which is adapted to rest or be supported on a surface of the structural member S or the fastening device F. As shown in FIGURE 3, the annular recess 23 is preferably formed in the base section 22 to support the coil 10 in as close relationship as practical to the end face for optimum electromagnetic coupling with the structural member S. Rotatably supported on the base section 22 is a semiconductor device support ring 24. This support ring 24 comprises an annular rim 25 having an annularly shaped flange 26 formed on an inner face of the rim and projecting a distance radially inward thereof. Suitable bearing elements 27 and 28 are carried by the base section 22 to support the ring 24 for revolution in a plane parallel to the end face of the base section 22. For this purpose, the base section 22 is formed with a reduced diameter hub portion 29 about which the annularly shaped bearing element 27 is positioned. The bearing element 28 is in the form of an annular disc and is supported on an upper end face of the base section 22 formed by the hub portion 29. The base section 22 is of cylindrical configuration with the coil 10 constructed with a diameter substantially equal to the diameter of the head of the fastening device with which the apparatus is designed to be utilized. The support ring 24 carries the semiconductor devices 13 and is adapted to support the devices in close relationship to the outer periphery of the base section 22 but in radially-outward spaced relationship. Assisting in maintenance of the support ring 24 in association with the base section 22 is an end plate 30. The end plate 30 comprises a circular disc supported at the upper end face of the hub portion 29 and extending radially outward to overlie the annular flange 26 of the support ring. An additional disc-shaped bearing element 28a is positioned between the opposed faces of the end plate 30 and the annularly shaped flange 26 to reduce frictional forces. As suitably formed handle 31 is threaded into a central socket 32 formed in the hub portion 29 and is adapted to secure the end plate 30 in fixed relationship to the base section 22. The necessary clamping force is applied by a shoulder 33 formed with the handle 31. A central, axially extending bore 34 formed in the handle 31 and cooperating drilled passageways 35 and 36 formed in the base section 22 receive an electrical cable 37 which connects with the coil 10 for energization of the coil by the A.C. power source 11.

Each of the hall devices 13 is secured to the lower end of a respective elongated, support rod 38 having a flanged head portion 38a which is adapted to be disposed in a suitably formed bore located in the periphery of the annular rim 25. A clamping nut 40 is threaded into the upper face of the annular rim 25 for engaging the head portion 38a to secure the support rod 38 in the desired position. Electrical connection of each of the Hall devices 13 to the circuitry of the apparatus is effected by a suitable electrical conductor 41 having the several leads thereof extending axially through a central bore formed in the respective support rod 38 for connection to the respective Hall device 13.

Orientation of the probe structure relative to the fastening device F to assure coaxial alignment thereof is facilitated by an orientation adaptor 42. The orientation adaptor 42 comprises a circular base plate 43 adapted to intefit with suitably formed recess 44 formed in the base or end face of the base section 22. Formed with the base plate 43 is an axially projecting lug which is formed to interfit with the slot C of the fastening device F. A pair of cap screws 46 extend through the base plate 43 of the orientation adaptor 42 and are threaded into the base section 22 to secure the adaptor to the base section. Positive alignment of the orientation adaptor 42 in predetermined relationship to the base section 22 may be advantageously effected by a pin 47 carried by the base section 22 and adapted to closely interfit in a socket 48 formed in the base plate 43. It is to be understood that the projection 45 of the orientation adaptor 42 would necessarily be modified to closely correspond and interfit with the slot C or index registration that may be formed in the head of a specific fastening device.

To further complete the indication of registration of the probe structure relative to the fastening device F or to a registration formed on the surface of the structural member S, an appropriate visible indexing means is provided in conjunction with the end plate 30 and the annular rim 25 of the semiconductor support ring 24. This may comprise uniformly spaced index marks formed on the periphery of the end plate 30 to indicate degrees of revolution and an index mark or arrow 49 formed on an upper face of the annular rim 25. Revolution of the support ring 24 about the base section 22 from a reference point will thus provide an indication of the position of the Hall devices 13 relative to the slot C of the fastening device F or other indexing registration formed on the structural member S and the relative location of an electrical discontinuity existing in the body of the structural member. Positive alignment of the end plate at its index marks relative to the orientation adaptor 42 may be conveniently effected by an alignment pin 50 carried by the base section 22 and adapted to interfit in a socket 51 formed in the end plate 30. Utilization of pin and socket alignment means will assure positive alignment of the several elements of the probe structure during assembly for accurate indication of the relative displacement of an electrical discontinuity and the index registration or slot C.

The embodiment of the probe structure illustrated in FIGURES 2 and 3 is provided with an additional bore 39 in which one of the Hall device supporting rods 38 may be positioned and secured to provide the configuration where the Hall devices are not disposed in diametrically opposed relationship. As previously described, a probe structure embodying this relative arrangement of the Hall devices 13 is not as responsive to long-term variables which may exist in the material.

Figure 6:
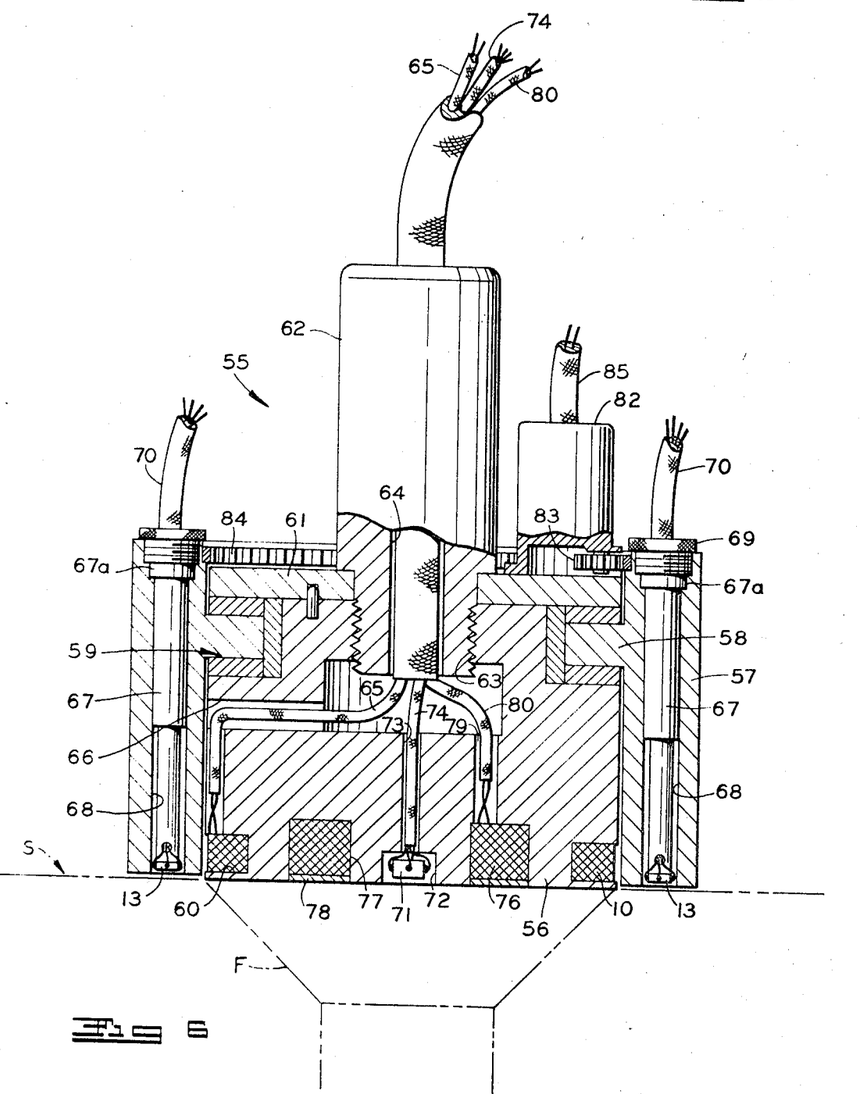
FIGURE 6 is a medial vertical sectional view of a modified probe structure.
Figure 7:
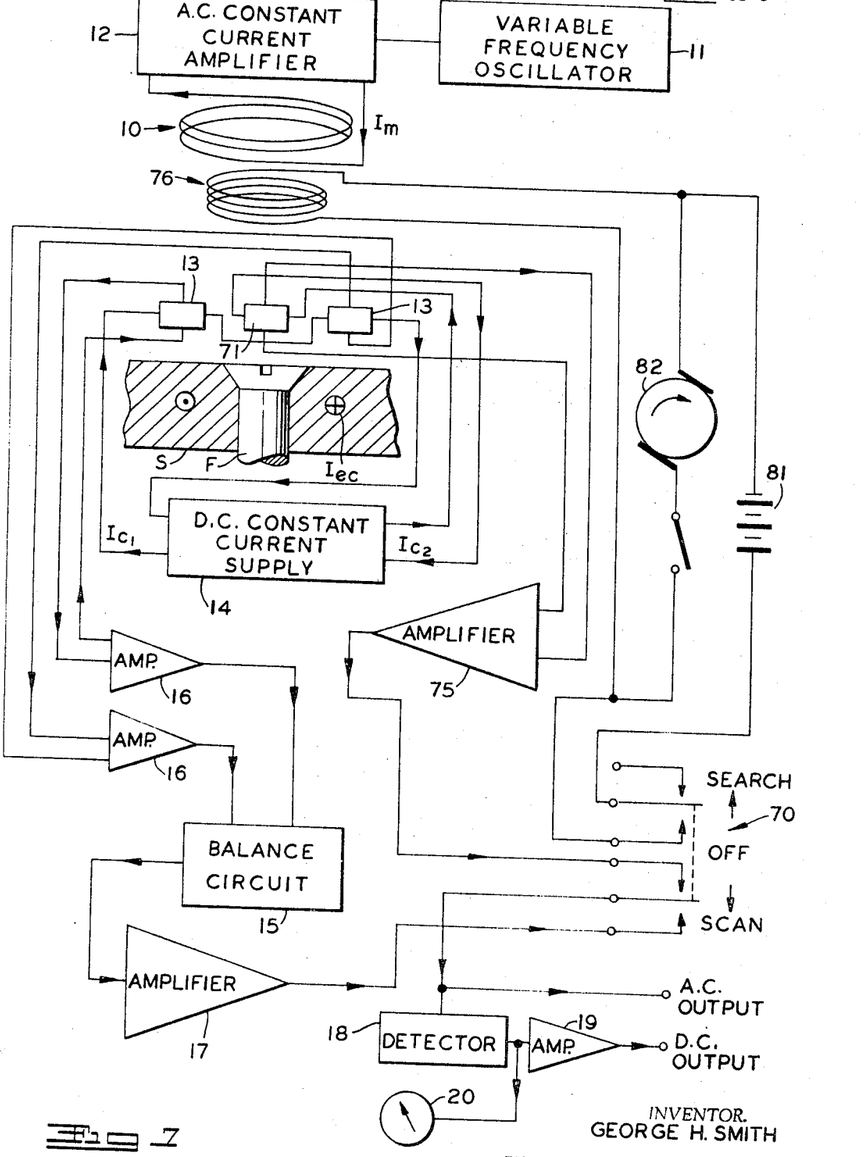
FIGURE 7 is a diagrammatic illustration of a test apparatus adapted to utilize the probe structure of FIGURE 6.

A modified probe structure 55 is illustrated in FIGURE 6 and a circuit utilizing the modified probe structure is illustrated in FIGURE 7. This modified probe structure 55 is of the same general configuration as the basic probe structure 21 illustrated in FIGURE 2 but incorporates electrical orientation means and auxiliary electromagnetic means for maintaining the probe structure in fixed relationship to the fastening device or aperture. Referring to FIGURE 6, the modified probe structure 55 is seen to comprise a base section 56 of cylindrical configuration and a Hall device support ring 57 adapted to be mounted on the base section for revolution about the longitudinal axis. The base section 56 is formed with an annular shoulder at the upper end for cooperatively engaging a radially inwardly projecting annular flange 58 formed with the annular shaped rim of the Hall device support ring 57. A suitable bearing assembly 59 is also provided to reduce friction between the relatively rotatable base section and support ring. Formed about the base section 56 at the lower end thereof is an annular recess 60 which opens at the periphery to receive the magnetizing coil 10. An end plate 61 is secured to the opposite end of the base section by a handle 62 which is threaded into a central bore 63 in the base section with the end plate maintaining the Hall element support ring 57 in association with the base section 56. An axially extending passage 64 formed in the handle 62 opens at the inner end to an enlarged portion of the bore 63 formed in the base section. A multiconductor electrical cable 65 extends through this passage 64 and a connecting radial passage 66 for connection with the coil 10.

Carried by the Hall device support ring 57 are a pair of support rods 67 of elongated cylindrical form having flanged head portions 67a and adapted to fit in vertically disposed, cylindrical bores 68 formed in the annular rim of the support ring. A clamping nut 69 is threaded into the upper end of each bore 68 for engaging the flanged head portion 67a of a respective support rod 67 for assuring maintenance of the support rod in fixed relationship to the support ring. Attached to the lowermost end of each support rod are the respective Hall devices 13 with the rods extending downwardly to a point where the Hall devices will be supported closely adjacent a surface of the structural member S. Each bore 68 may be filled with a suitable encapsulating compound (not shown) for protection of the Hall devices 13. A suitable multiconductor electrical cable 70 extends through a control bore of each of the support rods 67 for electrical connection of the Hall devices 13 with the necessary electronic circuits.

Having reference to FIGURE 7, it can be seen that the electrical circuitry for operation of the probe structure 55 in determining electrical discontinuities is substantially the same as that illustrated in FIGURE 1 and the same numerals be used as far as practicable. The power source for energization of the inductor coil 10 includes a variable frequency oscillator 11 and an A.C. constant current amplifier 12. A D.C. control current $I_{c1}$ for driving the Hall devices is provided by a D.C. constant current supply 14 with the two Hall devices having their current terminals series connected to assure identical current flow. Connected to the Hall voltage output terminals of each of the Hall devices 13 is a respective amplifier 16 with the output of each amplifier connected to a balance circuit 15. The balance circuit 15 is designed to combine the respective output signal of each amplifier 16 and form a differential output signal that will be zero when the probe structure 55 is positioned with the Hall devices 13 above areas of the test specimen S which do not include electrical discontinuities and will be a specific value when either Hall device 13 is located above a defect. This differential output signal is then amplified by an amplifier 17 which may be selectively connected to an output circuit through a three position switch mechanism 70 shown in the center "OFF" position. The output circuit includes an A.C. output and a D.C. output which is driven by a detector circuit 18 and a D.C. amplifier 19. A suitable visual indicating meter 20 may be connected to the D.C. output portion of this circuit.

With the switch mechanism 70 placed in the "SCAN" position, a circuit is completed from the amplifier 18 to the output circuit and the apparatus may be operated as previously described in connection with the circuit of FIGURE 1 and the probe structure 21 of FIGURE 3. Operation of the apparatus of FIGURE 7 will, therefore, not be further discussed with respect to operation in determining the existence of electrical discontinuities. For a "SCAN" operation, the Hall device support ring 57 would be revolved about the base section 56 through an arc of 180° to complete a testing operation in accordance with the testing procedure outlined in connection with the circuit of FIGURE 1 and probe structure 21 of FIGURE 2.

The modified probe structure 55 incorporates electrical orientation means to facilitate coaxial alignment of the probe structure with a fastening device F or the aperture formed in the test specimen S. This is accomplished by a third Hall device 71 which is supported centrally of the magnetizing coil 10 and adjacent the end face of the base section 56. A suitable recess 72 is formed in the center end face of the base section to receive the centering Hall device 71 and a drilled passage 73 connects the recess with the bore 63 for passage of the necessary electrical conductors 74 interconnecting the Hall device with the electrical circuit. The recess 72 is preferably filled with a suitable encapsulating compound (not shown) for protection of the Hall device 71. A D.C. control current $I_{c2}$ for driving the centering Hall device 71 may be provided by the D.C. constant current supply 14 while the Hall voltage output terminals are connected to an amplifier 75. This amplified Hall output voltage may then be applied to the output circuit through placement of the switch mechanism 70 in the "SEARCH" position which completes a circuit from the amplifier 75 to the A.C. output terminal and the detector 18.

Operation of the apparatus of FIGURE 7 in the search mode requires operation of the oscillator 11 for providing the necessary magnetizing field $H_0$. This magnetizing field $H_0$ induces eddy currents $I_{ec}$ in the test specimen S and fastening device F which produce a magnetic-reaction-field $H_r$. With the probe structure 55 symmetrically positioned relative to the fastener F or aperture, the magnetic-reaction-field will also be symmetrical and a specific total magnetic field $H_n$ will be observed by the centering Hall device 71. Displacement of the probe structure from this centered position will result in distortion of the magnetic-reaction-field and relative displacement of the magnetic-reaction-field $H_r$ and the magnetizing field $H_0$. The result of these two effects is a relative increase in the magnetic-reaction-field $H_r$ at the centering Hall device 71 which opposes the magnetizing field $H_0$ and thus decreases the net magnetic field $H_n$ sensed by the centering Hall device 71 as the Hall device is displaced from the center of the fastener F. By observing the output indications of the apparatus, the probe structure 55 may be readily aligned with the center of the fastening device.

At the conclusion of a centering operation, the switching mechanism 70 is placed in the "SCAN" position and an inspection operation performed as previously described. To assure maintenance of the probe structure 55 in the desired coaxially aligned position relative to the fastening device, a selectively operable electromagnet 76 is mounted on the base section 56. The electromagnet 76 is positioned in an annular recess 77 formed in the end face of the base section 56 and a cover plate 78 may be provided for the recess. A drilled passageway 79 connects the recess 77 with the bore 63 for passage of energizing conductors 80 from the electromagnet coil 76 to a source of D.C. electric power 81, a suitable battery in this instance. A set of contacts of the switching mechanism 70 are connected in circuit with the electromagnet 76 and the battery 81 and are operable to complete a circuit only when the switching mechanism is placed in the "SCAN" position. Energization of the electromagnet 76 creates a D.C. magnetic field which attracts the fastening device F to maintain the probe structure 55 in the desired position but does not affect the operation of the Hall devices 13 which are responsive to an A.C. magnetic field.

Further facilitating the scanning operation with the probe structure 55 is a drive means for revolving the Hall device support ring 57 about the base section 56. This drive means may comprise an electric motor 82 which is mounted in fixed relationship to the base section 56 and is mechanically coupled with the support ring 57 by a pinion gear 83 driven by the motor and an internal gear 84, formed on the inner periphery of the support ring 57. The motor 82 is connected in circiut by conductors 85 and is preferably connected in shunt relationship with the electromagnet 76. With such a connection, the motor 82 will be effective in revolving the support ring 57 concurrently with energization of the electromagnet in the "SCAN" mode of operation.

It is readily apparent from the foregoing detailed description that a novel test apparatus for determining electrical discontinuities in electrically conductive materials is provided by this invention. The differential connection of two semiconductor devices supported in radially outwardly displaced relationship to a closed loop magnetization coil provides a high degree of resolution in accurately determining electrical discontinuities.

Having thus described this invention, what is claimed is:

1. A magnetic-reaction test apparatus for nondestructively testing electrically conductive materials comprising magnetic-field-generating means including a closed loop inductor having an outer peripheral surface and positionable in inductively coupled relationship to the material and energizable to induce a flow of eddy currents in the material with the eddy currents being of a predetermined configuration and forming a related magnetic-reaction-field having components external to the material, said predetermined eddy current configuration being subject to distortion as a consequence of inclusion of regions of electrical nonconductivity in the inductively coupled portions of the material; magnetic-field-sensing means responsive to the magnetic-reaction-field to provide an output signal related to the magnetic-reaction-field, said magnetic-field-sensing means including at least two semiconductor devices in angularly spaced relationship supported a distance radially outward of the outer peripheral surface of said closed loop inductor in electromagnetically coupled relationship with the magnetic-reaction-field external to the material, each of said semiconductor devices responsive to respective portions of the magnetic-reaction-field whereby the output signal will be indicative of the relative characteristics of those sections of the material coupled with said semiconductor devices by the respective portions of the magnetic-reaction-field; and a probe structure for carrying said inductor and said semiconductor devices, said probe structure supporting said inductor adjacent the surface of a selected portion of the material being tested and including a first section adapted to be supported in fixed relationship to said surface and a second section rotatably mounted on said first section and adapted to carry said semiconductor devices whereby rotation of said second section relative to said first section will revolve said semiconductor devices in a closed loop about said first section.

2. A magnetic-reaction test apparatus according to claim 1 wherein each of said semiconductor devices comprises a Hall-effect device having a magnetic axis and being supported with the magnetic axis of each Hall-effect device in parallel relationship with the magnetic axis of each other Hall-effect device.

3. A magnetic-reaction test apparatus according to claim 2 wherein said magnetic-field-sensing means includes a D.C. current supply and each of said Hall-effect devices is connected thereto and is driven by a D.C. current of the same magnitude.

4. A magnetic-reaction test apparatus according to claim 1 wherein each of said semiconductor devices is of a type to provide a voltage output signal in response to the magnetic field coupled therewith and said magnetic-field-sensing means includes output circuit means connected in circuit with said semiconductor devices whereby the output signal is a function of the difference of the voltage output signals of respective pairs of said semiconductor devices.

5. A magnetic-reaction test apparatus according to claim 1 wherein said semiconductor devices are supported for revolution in a predetermined path relative to a fixed reference.

6. A magnetic-reaction test apparatus according to claim 1 wherein said semiconductor devices are equidistantly disposed relative to the outer peripheral surface of said closed loop inductor and each of said devices is disposed in predetermined, angularly displaced relationship relative to each other of said devices.

7. A magnetic-reaction test apparatus according to claim 6 wherein a pair of said semiconductor devices are disposed in diametrically opposed relationship.

8. A magnetic-reaction test apparatus according to claim 1 wherein said inductor is carried by said first section of said probe structure.

9. A magnetic-reaction test apparatus according to claim 1 wherein said probe structure is provided with motor means mechanically interconnected between said first and second sections and selectively operable to rotate said second section about said first section.

10. A magnetic-reaction test apparatus according to claim 1 wherein said probe structure is provided with means for orienting said structure relative to a selected portion of the material being tested.

11. A magnetic-reaction test apparatus according to claim 10 wherein said orienting means includes mechanical indexing means cooperatively engageable with an index formed on the material being tested.

12. A magnetic-reaction test apparatus according to claim 10 wherein said orienting means is adapted to orient said probe structure relative to the selected portion of the material being tested which is formed with a discontinuity that distorts the eddy currents produced by said inductor when said inductor is not symmetrically disposed relative to the discontinuity, said orienting means including second magnetic-field-sensing means having a magnetic-field-responsive semiconductor device centrally disposed relative to said inductor and circuit means connected with said device operable to provide an indication of the magnetic field sensed by said device whereby symmetrical orientation of said inductor relative to the discontinuity provides a predetermined indication.

13. A magnetic-reaction test apparatus according to claim 1 wherein said probe structure includes attaching means selectively operable to maintain said structure in predetermined relationship to a selected portion of the material being tested.

14. A magnetic-reaction test apparatus according to claim 13 wherein said attaching means comprises a selectively energizable electromagnet for cooperating with a material including magnetizable portions.

15. The method of nondestructively testing electrically conductive materials having an exterior surface and a hole formed therein which opens at the surface, the method consisting of positioning an elongated pin in the hole with the pin having an outer peripheral surface substantially coextensive with the hole and formed from a material having a permeability greater than unity, juxtaposing a closed loop inductor having an outer peripheral surface in coaxial alignment with the hole with the outer peripheral surface coextensive with the periphery of the hole and energizing the inductor to induce a flow of circulating eddy currents in the material around the hole thus forming a magnetic-reaction-field related to the characteristics of the material having components external to the surface of the material and radially outward of the outer peripheral surface of the inductor, simultaneously sensing the magnetic-reaction-field at at least two angularly displaced positions with respective magnetic-field-sensing semiconductor means disposed a distance outwardly of the outer peripheral surface of the inductor and juxtaposed to the surface of the material to provide respective output signals, differentially combining the respective output signals to provide a resultant output signal indicating the characteristics of the material affecting the sensed portions of the magnetic-reaction field, and revolving the magnetic-field-sensing semiconductor means around the inductor in predetermined relationship to the outer peripheral surface of the inductor.

References Cited

UNITED STATES PATENTS

| | | | |
|---|---|---|---|
| 3,312,898 | 4/1967 | Browne | 324—45 X |
| 3,286,168 | 11/1966 | Schmidt | 324—37 X |
| 3,359,495 | 12/1967 | McMaster | 324—40 |

RUDOLPH V. ROLINEC, *Primary Examiner.*

ALFRED E. SMITH *Assistant Examiner.*

U.S. Cl. X.R.

324—37, 45